United States Patent
Gu et al.

(10) Patent No.: US 11,250,012 B1
(45) Date of Patent: Feb. 15, 2022

(54) DATA QUERY METHOD AND SYSTEM

(71) Applicant: Shanghai IceKredit, Inc., Shanghai (CN)

(72) Inventors: Lingyun Gu, Shanghai (CN); Zhipan Guo, Shanghai (CN); Wei Wang, Shanghai (CN); Pengfei Xie, Shanghai (CN); Kaiping He, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/399,037

(22) Filed: Aug. 10, 2021

(30) Foreign Application Priority Data

Oct. 12, 2020 (CN) .......................... 202011081897.7

(51) Int. Cl.
*G06F 9/54* (2006.01)
*G06F 16/248* (2019.01)
*G06F 16/2455* (2019.01)
*G06F 16/2458* (2019.01)

(52) U.S. Cl.
CPC .......... *G06F 16/2471* (2019.01); *G06F 9/541* (2013.01); *G06F 16/248* (2019.01); *G06F 16/24552* (2019.01)

(58) Field of Classification Search
CPC ................. G06F 16/2471; G06F 9/541; G06F 16/24552; G06F 16/248

See application file for complete search history.

(56) References Cited

U.S. PATENT DOCUMENTS

| | | | | |
|---|---|---|---|---|
| 8,447,774 B1 * | 5/2013 | Robie | ................. | G06F 16/2471 707/760 |
| 8,515,963 B1 * | 8/2013 | Blank, Jr | ............ | G06F 3/04842 707/741 |
| 10,970,303 B1 * | 4/2021 | Denton | ............... | G06F 16/2471 |
| 2011/0264650 A1 * | 10/2011 | Tobin | .................... | G06F 16/248 707/722 |
| 2012/0310916 A1 * | 12/2012 | Abadi | ............... | G06F 16/24542 707/713 |
| 2018/0060394 A1 * | 3/2018 | Gawande | ................ | G06F 16/27 |
| 2018/0234550 A1 | 8/2018 | Lifson et al. | | |

FOREIGN PATENT DOCUMENTS

| | | |
|---|---|---|
| CN | 103024060 A | 4/2013 |
| CN | 108737527 A | 11/2018 |
| CN | 111787066 A | 10/2020 |

\* cited by examiner

*Primary Examiner* — Jorge A Casanova
(74) *Attorney, Agent, or Firm* — Bayramoglu Law Offices LLC

(57) ABSTRACT

A data query method and a data query system are provided. A data query server loads, based on a preset configuration interface, configuration metadata sent by a central cluster server for a target application programming interface (API), to a target storage region being located in a database server and associated with the target API, and loads queryable data associated with the target API to the target storage region. Then, the central cluster server sends a query instruction to the data query server based on query metadata in a data query request sent by a user terminal for the target API. After that, the data query server queries corresponding target query data in the target storage region and sends the target query data to the user terminal through the central cluster server. In this way, a data query service can be provided in a form of an API interface.

10 Claims, 3 Drawing Sheets

DATA QUERY METHOD AND SYSTEM

CROSS REFERENCE TO THE RELATED APPLICATIONS

This application is based upon and claims priority to Chinese Patent Application No. 202011081897.7, filed on Oct. 12, 2020, the entire contents of which are incorporated herein by reference.

TECHNICAL FIELD

The present invention relates to the field of computer technologies, and more particularly, to a data query method and system.

BACKGROUND

The prior data query solutions are usually based on a database. Users can query required data information only by providing a query statement matched with a database system. In the case of big data, however, the query statement often needs to be continuously optimized, otherwise an improper query condition will lead to query exception. Therefore, users need to be familiar with the structures of the database system and a data table as much as possible, which results in low query efficiency.

SUMMARY

Based on the shortcomings of the prior design, the present invention provides a data query method and system. In this way, a data query service can be provided in a form of an application programming interface (API), and a user does not need to pay attention to a query statement of a database. This avoids a query exception caused by an improper query condition entered by the user because the user is not familiar with structures of a database system and a data table, and improves query efficiency.

According to a first aspect of the present invention, a data query method is provided, applied to a data query system, where the data query system includes a central cluster server, a plurality of data query servers communicating with the central cluster server, and a database server communicating with each data query server; the method includes:

obtaining, by the data query server based on a preset configuration interface, configuration metadata sent by the central cluster server for a target API, loading the configuration metadata to a target storage region being located in the database server and associated with the target API, and loading queryable data associated with the target API to the target storage region;

sending, by the central cluster server after receiving a data query request sent by a user terminal for the target API, a query instruction to the data query server based on query metadata in the data query request; and querying, by the data query server, corresponding target query data in the target storage region based on the query instruction, and sending the target query data to the user terminal through the central cluster server.

In a possible implementation of the first aspect, the step of obtaining, by the data query server based on the preset configuration interface, configuration metadata sent by the central cluster server for the target API, and loading the configuration metadata to the target storage region being located in the database server and associated with the target API includes:

parsing the configuration metadata and checking whether a format of the configuration metadata meets a preset format requirement, and if the format of the configuration metadata meets the preset format requirement, configuring the following data based on the configuration metadata: an API access path of the target API, information of a database table used to store the queryable data of the target API, and a query request parameter and a query request mode that are used to query the information of the database table of the queryable data of the target API;

adding the configuration metadata to a preset configuration table, and loading a serialized object in the preset configuration table to the target storage region being located in the database server and associated with the target API; and loading the queryable data associated with the target API to the target storage region.

In a possible implementation of the first aspect, the configuration metadata further includes cache configuration information, and the method further includes:

configuring, by the data query server, a cache database of the target storage region, caching duration, and a cache generation rule based on the cache configuration information; and detecting, by the data query server, whether the configuration metadata is updated, and when detecting that the configuration metadata is updated, caching the configuration metadata to a running memory of the data query server, and performing cache configuration on the configuration metadata in the cache database based on the caching duration and the cache generation rule both configured in advance.

In a possible implementation of the first aspect, the step of loading the queryable data associated with the target API to the target storage region includes:

obtaining the target query data meeting a preset query condition in the queryable data associated with the target API, and adding the target query data to the cache database of the target storage region; and performing cache configuration on the target query data in the cache database based on the caching duration and the cache generation rule.

In a possible implementation of the first aspect, the step of loading the queryable data associated with the target API to the target storage region includes:

obtaining the queryable data of the target API based on a preset write interface, and inserting the queryable data into a corresponding data table in the target storage region according to a sharding policy and based on the information of the database table storing the queryable data of the target API; and generating a global unique identifier of each data record in the queryable data based on a SnowFlake algorithm, and using the global unique identifier as a sharding key.

In a possible implementation of the first aspect, the step of loading the queryable data associated with the target API to the target storage region further includes:

constructing a heterogeneous index table by using an asynchronous mechanism and a plurality of types of query index fields in the data table, where the heterogeneous index table includes a plurality of query index fields and global index identifiers.

In a possible implementation of the first aspect, the step of sending, by the central cluster server after receiving the data query request sent by the user terminal for the target API, the query instruction to the data query server based on the query metadata in the data query request includes:

obtaining, by the central cluster server, a global index identifier meeting a query request condition through query in the heterogeneous index table based on the data query request of the user terminal; and obtaining a data result corresponding to a request parameter of the data query request through query in the corresponding data table based on the global index identifier, and returning the data result to the user terminal.

According to a second aspect of the present invention, a data query system is provided, where the data query system includes a central cluster server, a plurality of data query servers communicating with the central cluster server, and a database server communicating with each data query server;

the data query server is configured to obtain, based on a preset configuration interface, configuration metadata sent by the central cluster server for a target API, load the configuration metadata to a target storage region being located in the database server and associated with the target API, and load queryable data associated with the target API to the target storage region;

the central cluster server is configured to send, after receiving a data query request sent by a user terminal for the target API, a query instruction to the data query server based on query metadata in the data query request; and the data query server is configured to query corresponding target query data in the target storage region based on the query instruction, and send the target query data to the user terminal through the central cluster server.

Based on any one of the above aspects, in an implementation provided in the present invention, the data query server loads, based on the preset configuration interface, the configuration metadata sent by the central cluster server for the target API, to the target storage region being located in the database server and associated with the target API, and loads the queryable data associated with the target API to the target storage region. Then, the central cluster server sends the query instruction to the data query server based on the query metadata in the data query request sent by the user terminal for the target API. After that, the data query server queries the corresponding target query data in the target storage region and sends the target query data to the user terminal through the central cluster server. In this way, a data query service can be provided in a form of an API interface, and a user does not need to pay attention to a query statement of the database, thereby reducing a difficulty of data query and a probability of a query exception. This avoids a query exception caused by an improper query condition entered by the user because the user is not familiar with structures of a database system and a data table, and improves query efficiency.

BRIEF DESCRIPTION OF THE DRAWINGS

To describe the technical solutions in the embodiments of the present invention more clearly, the accompanying drawings required for describing the embodiments are briefly described below. It should be understood that the following accompanying drawings show merely some embodiments of the present invention, and therefore should not be regarded as a limitation to the scope. A person of ordinary skill in the art may still derive other related drawings from these accompanying drawings without creative efforts.

DETAILED DESCRIPTION OF THE EMBODIMENTS

To make the objective, technical solutions, and advantages of the present invention clearer, the technical solutions in the embodiments of the present invention are clearly and completely described below with reference to the accompanying drawings in the embodiments of the present invention. It should be understood that the accompanying drawings in the present invention are only used for description, and are not intended to limit the protection scope of the present invention. In addition, it should be understood that the schematic accompanying drawings are not drawn based on a scale of a real object. The flowchart used in the present invention illustrates operations implemented based on some embodiments of the present invention. It should be understood that the operations in the flowchart may be performed out of sequence, and the steps without a logical context relationship may be performed in a reverse sequence or at the same time. In addition, those skilled in the art may add one or more other operations to the flowchart or remove one or more operations from the flowchart based on the content of the present invention.

Figure 1:
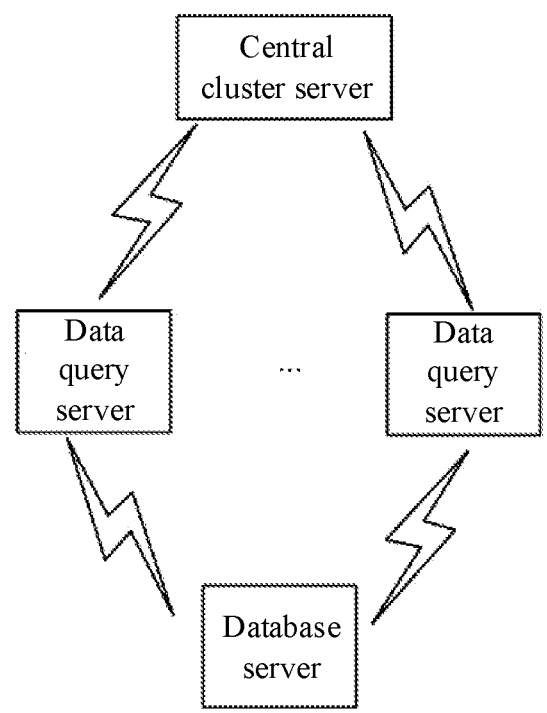
FIG. 1 is a schematic diagram of an architecture of a data query system according to an embodiment of the present invention.
Figure 2:
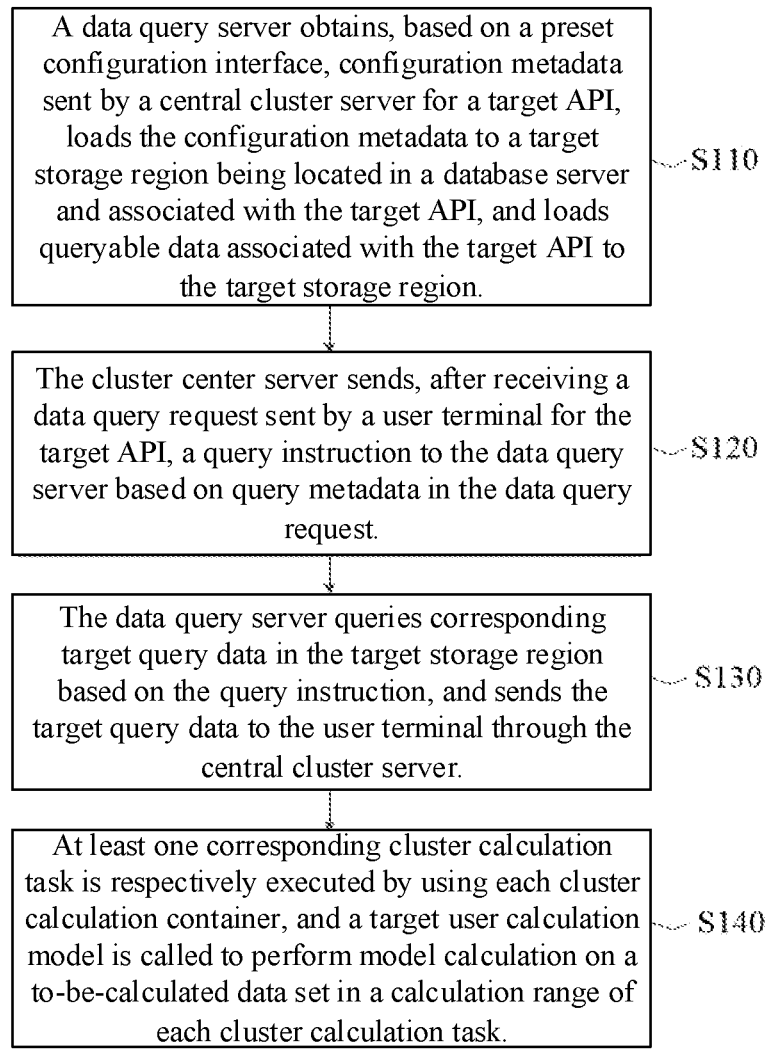
FIG. 2 is a schematic flowchart of a data query method according to an embodiment of the present invention.

Refer to FIG. 1 and FIG. 2. FIG. 1 is a schematic diagram of an architecture of a data query system according to an embodiment of the present invention. FIG. 2 is a schematic flowchart of a data query method based on the above data query system according to an embodiment of the present invention. The data query system may include a central cluster server, a plurality of data query servers communicating with the central cluster server, and a database server communicating with each data query server. The central cluster server may be configured to monitor a status of each data query server and coordinate allocation of a data query request sent by a user terminal. The database server may include one or more server nodes, and uniformly provides a data storage service for each data query server by using the one or more server nodes.

Detailed steps of the data query method are described in detail below. It can be understood that, in another embodiment, sequences of some steps in the data query method in this embodiment may be exchanged based on an actual need, or some steps may be omitted or deleted.

Step S110: The data query server obtains, based on a preset configuration interface, configuration metadata sent by the central cluster server for a target API, loads the configuration metadata to a target storage region being located in the database server and associated with the target API, and loads queryable data associated with the target API to the target storage region.

In this embodiment, the preset configuration interface can provide a user with a configuration screen for the target API in a form of a software interaction interface, so that the user can configure the configuration metadata of the target API on the configuration screen. The target API may be flexibly selected based on an actual business need, for example, may be a target API of an order business or a payment business.

Step S120: The cluster center server sends, after receiving a data query request sent by the user terminal for the target API, a query instruction to the data query server based on query metadata in the data query request.

Step S130: The data query server queries corresponding target query data in the target storage region based on the query instruction, and sends the target query data to the user terminal through the central cluster server.

Based on the above design, a data query service can be provided in a form of an API interface, and the user does not need to pay attention to a query statement of the database, thereby reducing a difficulty of data query and a probability of a query exception. This avoids a query exception caused by an improper query condition entered by the user because the user is not familiar with structures of a database system and a data table, and improves query efficiency.

In a possible implementation, step S110 may be implemented by performing the following exemplary substeps S111 to S113. Details are as follows:

Sub step S111: Parse the configuration metadata and check whether a format of the configuration metadata meets a preset format requirement, and if the format of the configuration metadata meets the preset format requirement, configure the following data based on the configuration metadata: an API access path of the target API, information of a database table used to store the queryable data of the target API, and a query request parameter and a query request mode that are used to query the information of the database table of the queryable data of the target API.

For example, one data table can support a plurality of types of database tables, for example, MySQL, Oracle, and MongoDB. Therefore, in the configuration metadata, an identifier parameter (data_base) of a database type can be added, and a custom data table name (table_name) is supported. In addition, an index rule can also be configured. The index rule can support various types of indexes, and an index type keyword of the database is used as a configured key (index), so that the information of the database table storing the queryable data of the target API can be configured.

A request parameter configuration of the target API may include the query request parameter and the query request mode. The query request mode may be POST, GET, or the like. A configuration of the query request parameter may include a JSON path (path) whose value is obtained from the request, a column name (column) of the request parameter in a corresponding data table of the target API, a data type of the request parameter in the database, and the like.

Substep S112: Add the configuration metadata to a preset configuration table, and load a serialized object in the preset configuration table to the target storage region being located in the database server and associated with the target API.

Substep S113: Load the queryable data associated with the target API to the target storage region.

Further, in a possible example, the configuration metadata may further include cache configuration information, so that the target API can support a caching function, for example, Redis. Based on this, the data query server may configure a cache database of the target storage region, caching duration, and a cache generation rule based on the cache configuration information. For example, the cache configuration information may be added to the configuration metadata. The cache configuration information may include the cache database of the target storage region, the caching duration, the cache generation rule, and other related parameters. The caching duration may be a month, a day, or an hour (valid time). For a cache key of the cache generation rule, each element may be concatenated by using an underline. A string and a string value obtained from the JSON path starting with a dollar sign (such as "$") are supported.

Based on the above descriptions, the data query server detects whether the configuration metadata is updated, and when detecting that the configuration metadata is updated, caches the configuration metadata to a running memory of the data query server, and performs cache configuration on the configuration metadata in the running memory based on the caching duration and the cache generation rule both configured in advance.

In a possible implementation, in substep S113, to speed up subsequent query, the data query server may obtain the target query data meeting a preset query condition in the queryable data associated with the target API, add the target query data to the cache database of the target storage region, and perform cache configuration on the target query data in the cache database based on the caching duration and the cache generation rule.

It should be noted that the preset query condition may be configured based on an actual design need, for example, may be set as that a quantity of query times is greater than a specified value. When a quantity of query times of a piece of target query data is greater than the specified value, the target query data is added to the cache database of the target storage region. Then, cache configuration is performed on the target query data in the cache database based on the caching duration and the cache generation rule. In this process, the caching duration may be flexibly configured based on the quantity of query times. For example, a larger quantity of query times leads to longer caching duration.

In a possible implementation, in substep S113, to facilitate users' different index needs, in this embodiment, the queryable data of the target API may alternatively be obtained based on a preset write interface, and the queryable data is inserted into the corresponding data table in the target storage region according to a sharding policy and based on the information of the database table storing the queryable data of the target API. In this process, a global unique identifier of each data record in the queryable data may be generated based on a SnowFlake algorithm, and used as a sharding key.

Further, in a possible implementation, in this embodiment, a heterogeneous index table may be constructed by using an asynchronous mechanism and a plurality of types of query index fields in the data table, where the heterogeneous index table includes a plurality of query index fields and global index identifiers. In this way, the user can obtain, through query based on the index table instead of an index query condition, a global index identifier list meeting a condition, and then query data in the data table based on the global index identifier.

Based on the above descriptions, for step S120, in a specific data query process, the central cluster server may obtain a global index identifier meeting a query request condition through query in the heterogeneous index table based on the data query request of the user terminal, obtain a data result through query in the corresponding data table based on the global index identifier, and return the data result to the user terminal.

For example, the target API may be accessed by using a preset query interface. For a request parameter of the data query request of the target API, a data query server can be accessed based on a path of the target API or the data table name. After the target API is called, the corresponding target query data is queried in the target storage region by using the data query server.

A request mode in the above request parameter is the same as that in the above metadata configuration information. A request path in the request parameter may be constituted by an IP address, a port number, or a domain name of a unified entrance of the data query service, and an API access path. Then, Content-type in header information of the request parameter may be set to application/j son, and a specific query parameter in a JSON format, for example, a query parameter of a dimension of the order service, is encapsulated in a request body.

In addition, each field in the specific query parameter may correspond to a JSON array of one query rule. The query rule may include a value (value) and a matching rule (rule). The matching rule may include EQUAL, NOT_EQUAL, GT, ST, GE, SE, and the like.

For another example, the specific query parameter may alternatively include only one or some of all provided parameter fields. Therefore, it is unnecessary to match all the fields in the metadata configuration information of the target API. Moreover, a plurality of query conditions may also be configured in one field, so that a plurality of pieces of data can be queried.

In the above process, the user may further delete the metadata configuration information of the target API, the related data table and cache database, and the like by using a preset deletion interface. For example, after metadata configuration information of a target API is deleted, a corresponding cache database is also deleted. In addition, the metadata configuration information of the target API may further be updated at any time by using a preset update interface.

Further, when the metadata configuration information of the target API is updated, the request parameter may be similar to the metadata configuration information, and may overwrite original configuration information. In addition, a structure of the corresponding data table is updated with the updated metadata configuration information. Data of a same field may be reused, a redundant data column may be deleted, and an empty data column may be added for the data table.

In the data query system provided in the embodiments of the present invention, a plurality of services mentioned above can be deployed in a form of a micro service, all data query services can be managed by using a central cluster server, and data query servers can be mutually discovered and communicate with each other by using a cluster registration center, to achieve load balancing. A plurality instances may be deployed for the data query service, to avoid a single-point fault.

Further, the data query server deployed in the cluster may also externally provide the data query service by using a gateway server. Therefore, the standard target API can be configured based on a user need, and the user can query required data by using the target API, or when the data table is available, the user configures the target API based on the user's need, and queries data.

Figure 3:
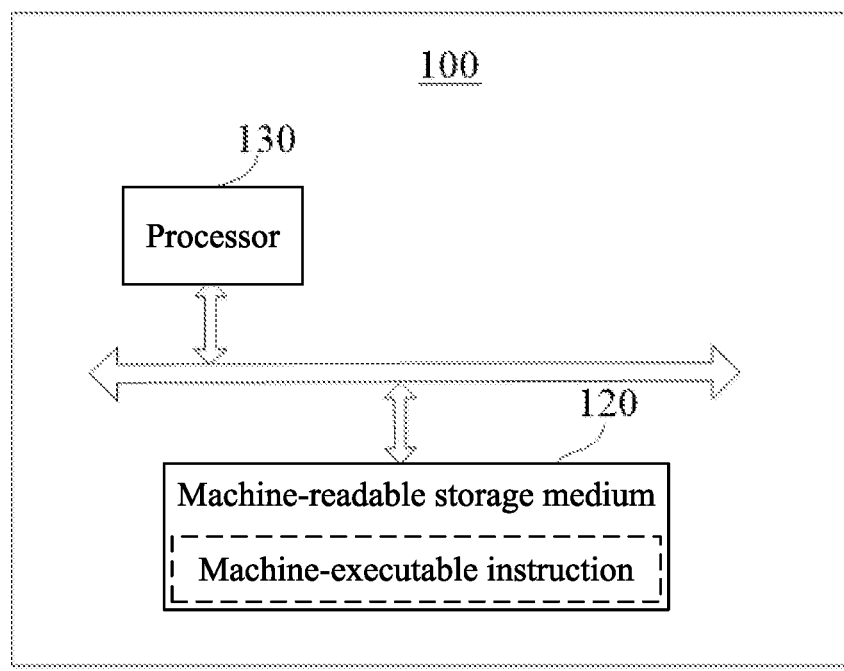
FIG. 3 is a schematic structural diagram of components of a server device for implementing a data query system according to an embodiment of the present invention.

Based on a same inventive concept, FIG. 3 is a schematic structural block diagram of a server device 100 configured to perform the above data query method according to an embodiment of the present invention. The server device 100 may include a machine-readable storage medium 120 and a processor 130. In this embodiment, the server device 100 may be a central cluster server, a plurality of data query servers communicating with the central cluster server, and a database server communicating with each data query server in FIG. 1.

In this embodiment, the machine-readable storage medium 120 and the processor 130 are both located in the server device 100, and are separated from each other. However, it should be understood that the machine-readable storage medium 120 may alternatively be independent of the server device 100 and may be accessed by the processor 130 by using a bus interface. Alternatively, the machine-readable storage medium 120 may be integrated into the processor 130, for example, may be a high-speed cache and/or a general register.

The machine-readable storage medium 120 may storage a machine-executable instruction, and the processor 130 may execute the machine-readable instruction to implement the above data query method.

The described embodiments are some rather than all of the embodiments of the present invention. Generally, the components of the embodiments of the present invention and shown in the accompanying drawings may be provided and designed in various manners. Therefore, the detailed description of the embodiments of the present invention with reference to the accompanying drawings is not intended to limit the protection scope of the present invention, but merely to represent the selected embodiments of the present invention. Therefore, the protection scope of the present invention shall be subject to the protection scope of the claims. All other embodiments obtained by those of ordinary skill in the art based on the embodiments of the present invention without creative efforts should fall within the protection scope of the present invention.

What is claimed is:

1. A data query method, applied to a data query system, wherein the data query system comprises a central cluster server, a plurality of data query servers communicating with the central cluster server, and a database server communicating with each data query server; the method comprises:
    obtaining, by the data query server based on a preset configuration interface, configuration metadata sent by the central cluster server for a target application programming interface (API), loading the configuration metadata to a target storage region being located in the database server and associated with the target API, and loading queryable data associated with the target API to the target storage region;
    sending, by the central cluster server after receiving a data query request sent by a user terminal for the target API, a query instruction to the data query server based on query metadata in the data query request; and
    querying, by the data query server, corresponding target query data in the target storage region based on the query instruction, and sending the target query data to the user terminal through the central cluster server.

2. The data query method according to claim 1, wherein the step of obtaining, by the data query server based on the preset configuration interface, configuration metadata sent by the central cluster server for the target API, and loading the configuration metadata to the target storage region being located in the database server and associated with the target API comprises:
    parsing the configuration metadata and checking whether a format of the configuration metadata meets a preset format requirement, and if the format of the configuration metadata meets the preset format requirement, configuring the following data based on the configuration metadata: an API access path of the target API, information of a database table used to store the queryable data of the target API, and a query request parameter and a query request mode used to query the information of the database table of the queryable data of the target API;

adding the configuration metadata to a preset configuration table, and loading a serialized object in the preset configuration table to the target storage region being located in the database server and associated with the target API; and loading the queryable data associated with the target API to the target storage region.

3. The data query method according to claim 2, wherein the configuration metadata further comprises cache configuration information, and the method further comprises:

configuring, by the data query server, a cache database of the target storage region, caching duration, and a cache generation rule based on the cache configuration information; and detecting, by the data query server, whether the configuration metadata is updated, and when detecting that the configuration metadata is updated, caching the configuration metadata to a running memory of the data query server, and performing cache configuration on the configuration metadata in the cache database based on the caching duration and the cache generation rule both configured in advance.

4. The data query method according to claim 3, wherein the step of loading the queryable data associated with the target API to the target storage region comprises:

obtaining the target query data meeting a preset query condition in the queryable data associated with the target API, and adding the target query data to the cache database of the target storage region; and performing cache configuration on the target query data in the cache database based on the caching duration and the cache generation rule.

5. The data query method according to claim 2, wherein the step of loading the queryable data associated with the target API to the target storage region comprises:

obtaining the queryable data of the target API based on a preset write interface, and inserting the queryable data into a corresponding data table in the target storage region according to a sharding policy and based on the information of the database table storing the queryable data of the target API; and generating a global unique identifier of each data record in the queryable data based on a SnowFlake algorithm, and using the global unique identifier as a sharding key.

6. The data query method according to claim 5, wherein the step of loading the queryable data associated with the target API to the target storage region further comprises:

constructing a heterogeneous index table by using an asynchronous mechanism and a plurality of types of query index fields in the data table, wherein the heterogeneous index table comprises a plurality of query index fields and global index identifiers.

7. The data query method according to claim 6, wherein the step of sending, by the central cluster server after receiving the data query request sent by the user terminal for the target API, the query instruction to the data query server based on the query metadata in the data query request comprises:

obtaining, by the central cluster server, a global index identifier meeting a query request condition through query in the heterogeneous index table based on the data query request of the user terminal; and obtaining a data result corresponding to a request parameter of the data query request through query in the corresponding data table based on the global index identifier, and returning the data result to the user terminal.

8. A data query system, comprising a central cluster server, a plurality of data query servers communicating with the central cluster server, and a database server communicating with each data query server; wherein the data query server is configured to obtain, based on a preset configuration interface, configuration metadata sent by the central cluster server for a target application programming interface (API), load the configuration metadata to a target storage region being located in the database server and associated with the target API, and load queryable data associated with the target API to the target storage region;

the central cluster server is configured to send, after receiving a data query request sent by a user terminal for the target API, a query instruction to the data query server based on query metadata in the data query request; and the data query server is configured to query corresponding target query data in the target storage region based on the query instruction, and send the target query data to the user terminal through the central cluster server.

9. The data query system according to claim 8, wherein the data query server is specifically configured to:

parse the configuration metadata and check whether a format of the configuration metadata meets a preset format requirement, and if the format of the configuration metadata meets the preset format requirement, configure the following data based on the configuration metadata: an API access path of the target API, information of a database table used to store the queryable data of the target API, and a query request parameter and a query request mode used to query the information of the database table of the queryable data of the target API;

add the configuration metadata to a preset configuration table, and load a serialized object in the preset configuration table to the target storage region being located in the database server and associated with the target API; and load the queryable data associated with the target API to the target storage region.

10. The data query system according to claim 9, wherein the data query server is further specifically configured to:

when the configuration metadata further comprises cache configuration information, configure a cache database of the target storage region, caching duration, and a cache generation rule based on the cache configuration information;

detect that the configuration metadata is updated; and when detecting that the configuration metadata is updated, cache the configuration metadata to a running memory of the data query server, and perform cache configuration on the configuration metadata in the cache database based on the caching duration and the cache generation rule both configured in advance.

* * * * *